United States Patent [19]

Stemmler et al.

[11] 4,160,894
[45] Jul. 10, 1979

[54] METHOD AND APPARATUS FOR THE FOCAL FORM CUTTING OF A MOVING WEB OF MATERIAL BY A LASER BEAM

[75] Inventors: Kurt Stemmler, Neuwied; Peter Langenbeck, Frickingen; Günter Ehlscheid, Neuwied, all of Fed. Rep. of Germany

[73] Assignee: Winkler & Dunnebier Maschinenfabrik und Eisengiesserei KG, Neuwied am Rhein, Fed. Rep. of Germany

[21] Appl. No.: 851,569

[22] Filed: Nov. 14, 1977

Related U.S. Application Data

[62] Division of Ser. No. 685,601, May 12, 1976, abandoned.

[30] Foreign Application Priority Data

May 14, 1975 [DE] Fed. Rep. of Germany ....... 2521530

[51] Int. Cl.² .............................................. B23K 9/00
[52] U.S. Cl. .................................................. 219/121 L
[58] Field of Search ..... 219/121 L, 121 LM, 121 EB, 219/121 EM; 350/6.6; 331/94.5 R, 94.5 D; 313/111.8

[56] References Cited

U.S. PATENT DOCUMENTS

| | | | |
|---|---|---|---|
| 3,594,532 | 7/1971 | Lunau | 219/121 L |
| 3,642,343 | 2/1972 | Tchejeyan | 350/6.6 |
| 3,799,657 | 3/1974 | Dager et al. | 219/121 L |
| 3,953,706 | 4/1976 | Harris et al. | 219/121 L |
| 3,989,385 | 1/1976 | Dill et al. | 250/548 |

FOREIGN PATENT DOCUMENTS

1273983  5/1972  United Kingdom.

*Primary Examiner*—J. V. Truhe
*Assistant Examiner*—Fred E. Bell
*Attorney, Agent, or Firm*—Sughrue, Rothwell, Mion, Zinn and Macpeak

[57] ABSTRACT

A desired pattern to be cut from a moving web of material by a focused laser beam is traced by eccentrically mounting the focal lens 3 in a rotatable carrier 4. The lens may also be radially displaceable (FIG. 3), inclined and rotatable (FIG. 4), doubly rotatable (FIG. 5), and/or the carrier 4 may be linearly displaceable (FIG. 6). By suitably and simultaneously controlling the various motion parameters, whose resultants are superimposed on one another, any desired cutting pattern can be traced. The movements are primarily uni-directional rather than oscillatory, which greatly simplifies the implementing hardware, and since all of the laser beam reflecting mirrors involved are fixedly mounted and move only in planes parallel to the web, the laser beam focal length always remains constant.

6 Claims, 9 Drawing Figures

METHOD AND APPARATUS FOR THE FOCAL FORM CUTTING OF A MOVING WEB OF MATERIAL BY A LASER BEAM

This is a Division of application Ser. No. 685,601, filed May 12, 1976 now abandoned.

BACKGROUND OF THE INVENTION (1) Field of the Invention

This invention relates to a method and apparatus for the focal form cutting of a preferably moving web of material by means of a laser beam.

(2) Description of the Prior Art

The form cutting of paper, cardboard, or the like is generally effected by a blade or a set of blades. Blades and sets of blades require a cutting device which holds them and guides them during the cutting movement. The cutting device, necessarily mechanical, and the blades or sets of blades are subject to wear, are relatively complicated and costly, and allow only a limited cutting speed as well as, in the case of periodic operation, only a limited cutting frequency.

To avoid the disadvantages of mechanical blades it is already known to have a cut effected by the focal spot of a laser beam. To make a two-dimensional cut, moreover, suggestions have already been made for deflecting the laser beam at its cutting point one-dimensionally on one or more straight cutting paths which run obliquely or transversely to the direction of movement of the material, at controlled speeds. If a rectangular blank is to be cut by this process from a moving material web, commencing at the edge as shown in FIG. 1a, then the laser beam must first be deflected inwardly on a straight path which runs oblique to the direction of movement, and then it must be deflected outwardly on a second straight path which also runs oblique to the direction of movement of the material. The two cutting paths form an isosceles triangle on the material web as shown by broken lines 1, 2 in FIG. 1a. The speed of movement of the laser beam over the web is a function of the direction of movement and the speed of feeding of the web. The movements are oscillatory and, to obtain such directions of movement of the laser beam according to the prior art, relatively complicated mirror-deflection devices consisting of several elements are necessary. Particular difficulties arise regarding the focussing of the laser beam on the web since the distance between the web and the collector lens, i.e. the focal length, alters as a result of differing angles of deflection.

SUMMARY OF THE INVENTION

It is an object of the present invention to provide a method and apparatus of the type specified in the introduction which does not present these difficulties and which is suitable, in particular, for implementing the cutting-out of windows or the like from a moving web of material, not only at the edge of the web but also at a distance from it.

This object is realized in that to produce a two-dimensional form cut, at all points of the cut the focus of the laser beam lies in the plane of the web and is moved on a circular path on which further movement components are in some cases superimposed, all movement components being variable in their speed and being controllable independently of one another.

Before further details and developments of the invention are illustrated, and basic concept thereof will first be explained with reference to FIGS. 1b and 1c. FIG. 1b shows a circle on a paper web moving at a speed $V_p$. If the cutting point rotates on this circle at a constant speed it describes on the moving web a curve known as a cycloid. One half of the circle may be regarded as the path of the cutting point moving into the web and the other half as the path moving out of the web. It is worthy of note that no oscillating or pivoting movements are necessary to produce this cycloidal path and that the carrier for the lens focussing the laser beam rotates in the same direction. If, to obtain a desired cut shape, deviations from the pure cycloid as illustrated in FIG. 1b are necessary, as for example the broken path in FIG. 2 shows, these can be obtained by varying the speed of the cutting point on the circular path, i.e. the speed of rotation of the lens carrier is decreased or increased. If, for example, the border shape of an envelope is to be cut, as illustrated in FIG. 1c, then the fact that the form of the cycloid already largely coincides with the intended cut shape cooperates with the intended cutting process.

Since in many cases a circular path is not sufficient to obtain the desired cut pattern, the invention provides that in some cases further movement components are superimposed on the circular path movement, that the cutting point for example is moved radially with regard to the circle center. The further movement components may also be circular movements about an imaginary point on the circular arc in accordance with FIG. 1. It may also be provided that the center of the circular path according to FIG. 1b is displaced linearly or on a circular arc.

It is not always necessary for the laser beam to strike the material web vertically; it may also be focussed obliquely on the web. If necessary the laser beam may additionally be altered in its angle of incidence. Within the scope of the present invention an abundance of variable quantities are available to produce any desired cut pattern.

An apparatus in accordance with the invention comprises a laser beam source and a lens focusssing the laser beam on the material web. The lens is supported on a rotatable, and if necessary movable, lens carrier on which the lens is fixed eccentrically to the axis of rotation such that its optical axis extends substantially parallel to the axis of rotation. The laser beam is passed through the axis of rotation and via surface mirrors to the lens. The bearing element of the lens carrier may be disposed on a rotatable carrier whose axis of rotation runs parallel to the axis of rotation of the lens carrier. The laser beam is then passed through the axis of rotation of the bearing element carrier and through surface mirrors into the axis of rotation of the lens carrier from where it is passed via further surface mirrors to the lens. By superimposition of the rotational movements of bearing element and bearing element carrier any desired point on a circular surface can be reached by the focus of the laser beam, whose maximum radius corresponds to the sum of the eccentricities of both the lens in relation to the lens carrier axis of rotation and the lens carrier axis of rotation in relation to the bearing element axis of rotation.

Alternatively or additionally the optical axis of the lens may be positioned oblique to the web and the lens pivoted on the lens carrier about an axis extending vertically the web. In this case too, with corresponding inclination of the optical axis of the lens towards the web, any point on a circular surface can be aimed at whose greatest radius is determined by the eccentricity of the lens in relation to the lens carrier axis of rotation and also the inclination of the optical axis of the lens in relation to the material web.

A prerequisite for all points of said circular surfaces being able to be reached by the laser beam is that eccentricities and, if applicable, inclination of the optical axis of the lens, are so selected that the laser beam can also be focussed into the center of the circle. The eccentricity of the lens in relation to the axis of rotation of the lens carrier must in this case therefore be at least as great as the eccentricity of the lens carrier axis of rotation in relation to the axis of rotation of the bearing element carrier or, in the case of a given distance between the web and the lens where there is an inclined optical axis, the angle of inclination must be so great that the eccentricity of the lens in relation to the axis of rotation of the lens carrier is compensated.

If necessary the lens on the lens carrier or at least one of the surface mirrors can be tiltably mounted so that an additional displacement of the laser beam focus on the material web is possible in the range of the focussing limits.

In order to obtain as great a variety of the controllable cutting curves as possible it is further expedient, and perhaps even necessary, to dispose the cycloid tracer head, i.e., the circular bearing, at the end of a linearly displaceable control rod. In this way a linear movement can be superimposed continuously and also controllably on the circular movement differing from the previously described linear movements in that it can be actuated during operation and that it is also adjustable in its direction, i.e. its angular direction with respect to the web. Linear motors or spherically threaded spindles which are connected to incremental angle step transmitters are particularly suitable for this linear control process.

To summarize, it can be extablished that to produce any desired cutting curve there are available pure circular movement, the adjustment of the radius of the circle in the sense of both pre-programming and during operation, and finally linear movement using different feeds and also different angles of incidence in relation to the web.

BRIEF DESCRIPTION OF THE DRAWINGS

The method and apparatus of the invention will now be described in detail with reference to FIG. 1-6 of the drawings, in which exemplified embodiments are illustrated.

DESCRIPTION OF THE PREFERRED EMBODIMENTS

Figure 3:
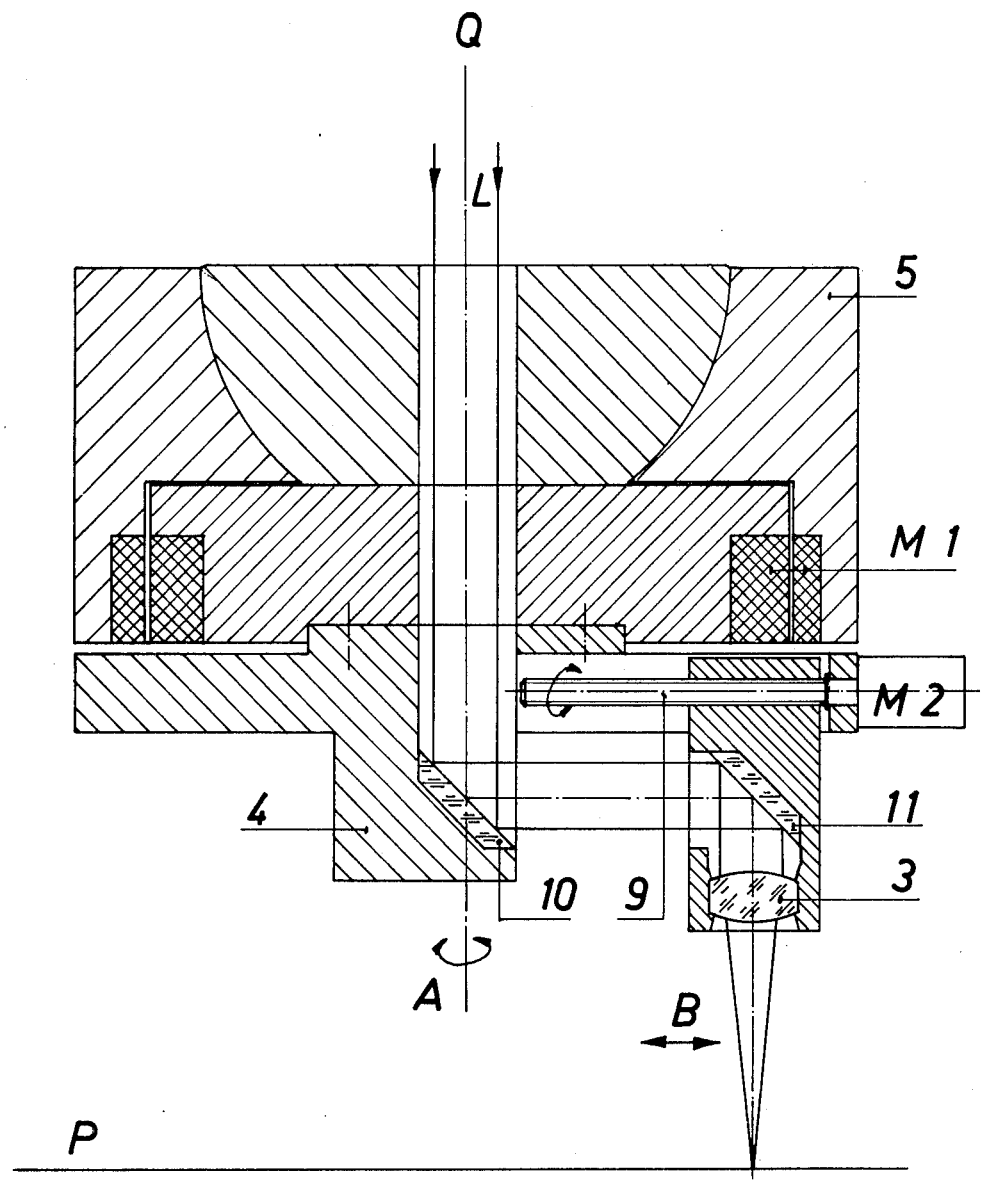
FIG. 3 shows an arrangement with a rotatable lens carrier, on which the lens is radially displaceable.

In the embodiment according to FIG. 3 there is provided a lens 3 which is fixed to a lens carrier 4. The lens carrier 4 is rotatably mounted in a bearing element 5. The lens carrier 4 as a whole extends through the bearing element 5 and is rotatably driven relative to the latter by a linear motor M1 whose interacting coils are attached to it and the bearing element 5. The lens 3 is radially displaceable relative to the axis of rotation of the lens carrier 4. This displacement is effected by a motor M2 and a spindle 9 driven thereby. The rotational movement of the lens carrier is characterized by the arrow A; the radial displacement movement of the lens is characterized by the arrow B.

Figure 1A:
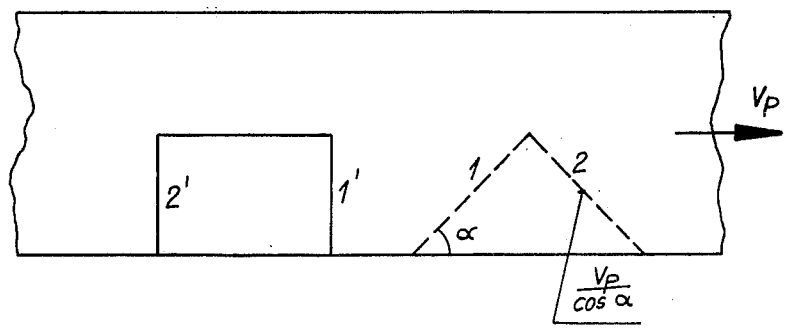
FIGS. 1a, 1b, and 1c shows cutting paths followed by a laser beam moving relative to a material web.
Figure 1B:
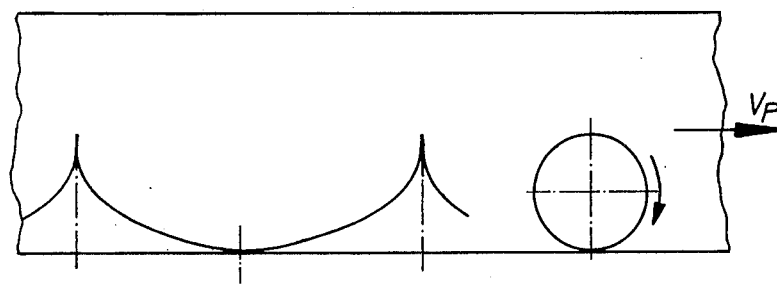
Figure 1C:
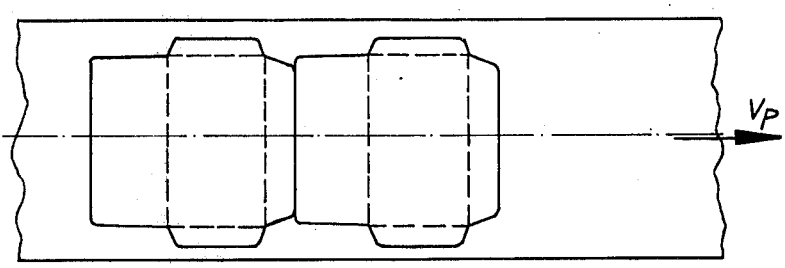
Figure 2:
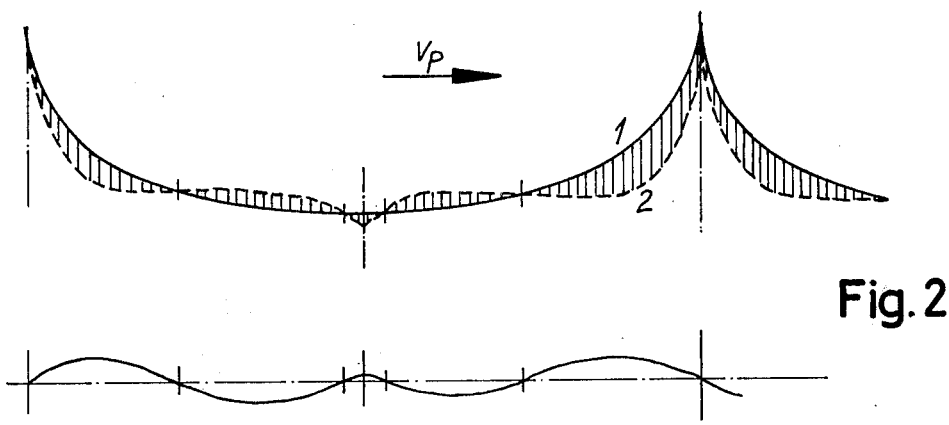
FIG. 2 shows another cutting path followed by a laser beam.

A laser beam L which is passed through the hollow center of the lens carrier 5 is emitted by a laser beam source Q. The laser beam L strikes a first surface mirror 10, from which it is passed to a second surface mirror 11 and from the latter to the lens 3. The lens 3 focusses the laser beam L on the material web P which is carried along under the lens 3. By actuating the motor M1 the lens 3 can be moved on a circular path about the rotational axis of the lens carrier 4 so that a cycloidal curve in accordance with FIG. 1b can be produced by the laser beam L on the moving material web. The shape of this curve can be altered by controlling the rotational speed, e.g. along the lines of the curve shown in FIG. 2.

Excitation of the motor M2 makes available an additional means for adapting the radius of the circular path to the required conditions or for producing specific curve patterns by superimposing two movements.

The illustrated arrangement makes possible the movement of the focal point of the laser beam without the focus being affected. This is due to the fact that all motion is accomplished in a range of the laser beam in which the latter is not yet focussed, and the distance between the lens and the web always remains constant.

Figure 4:
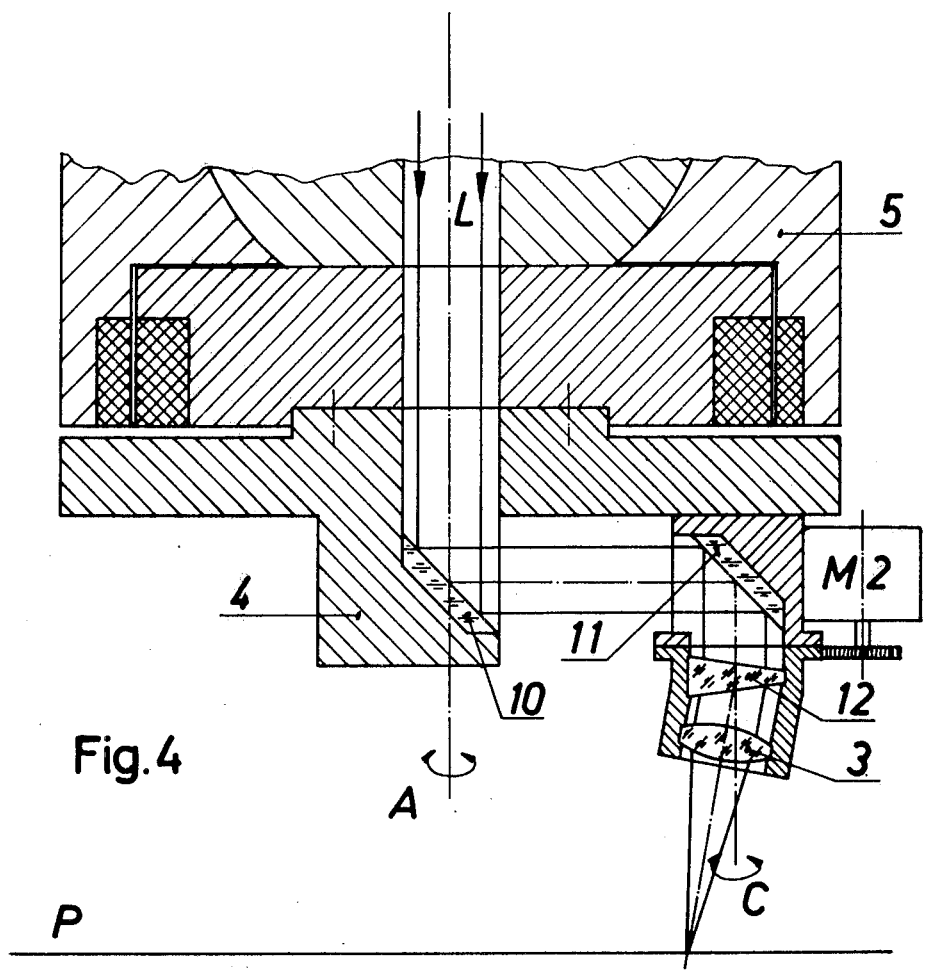
FIG. 4 shows an embodiment with a rotatable lens carrier, in which the optical axis of the lens is inclined and can be rotated relative to the lens carrier.

FIG. 4 shows another embodiment in which the lens 3 is inclined in its optical axis. The inclination of the path of rays is implemented a prism 12 in the path of rays between the second surface mirror 11 and the lens 3. The lens 3 is mounted rotatably about an axis which extends vertically to the web P. The rotating drive of this rotational movement is produced by a motor M2 mounted on the lens carrier 4. In a full rotational movement the focussed laser beam L describes the surface of a cone. The direction of rotation of this movement is characterized by the arrow C.

It should be noted that the prism 12 can also be arranged in the path of rays between the lens 3 and the web P, and that the lens 3 therefore does not need to be inclined in relation to the material web P. This embodiment is illustrated as a detail in FIG. 4a.

In FIG. 4 the axis of the focussed laser beam L is illustrated with only a slight inclination. This amount of this inclination depends on the requirements of a given cutting operation, particularly whether the center of the rotational movement A has to be reached or not. It is also dependent on the distance between the lens 3 and the web P. In addition, a radial displacement of the lens relative to the axis of rotation of the lens carrier 4 may also be provided as illustrated in FIG. 3. For reasons of clarity such as illustration has been left out of the scope of FIG. 4.

Figure 5:
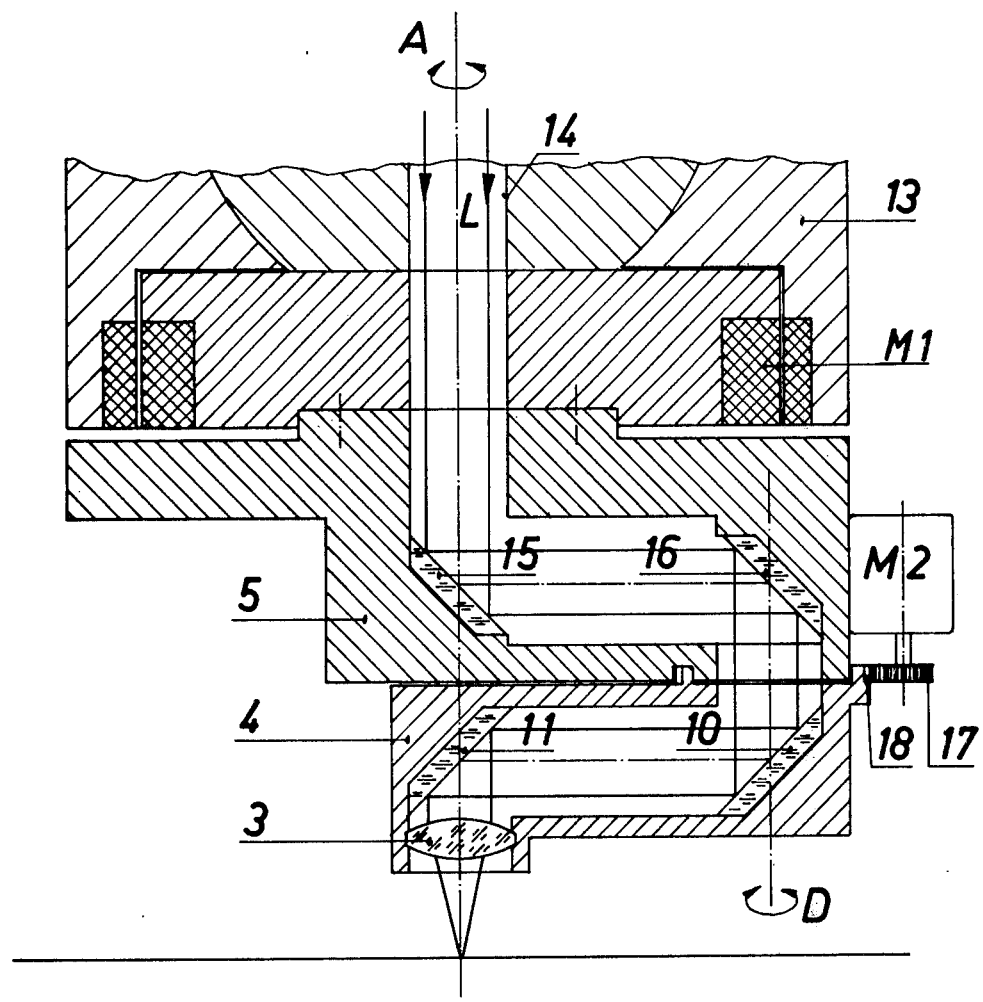
FIG. 5 shows an embodiment in which the lens carrier is mounted rotatably on a bearing element, which in turn is rotatably mounted.

FIG. 5 shows an embodiment which permits an extremely wide range of movement for the lens 3 and is thus adapted to meet the widest demands as to the cut pattern to be achieved. This embodiment consists—without taking into account the possibility of axial displacement of the lens—essentially of the series connection of two arrangements such as have already been described in the example of FIG. 3. Again a lens 3 is attached to a lens carrier 4. The lens carrier 4 is rotatably mounted on a bearing element 5 which in turn is rotatably mounted on a bearing element carrier 13. The mounting of the bearing element 5 in the carrier 13 corresponds to the mounting of the lens carier 4 in the embodiments of FIGS. 3 and 4, including the drive. The laser beam L runs through the hollow shaft end 14 which is constructed on the bearing element 5 and strikes a first surface mirror 15 which projects it onto a second surface mirror 16. The surface mirror 16 reflects the laser beam L into the axis of rotation of the lens carrier 4 from which it is projected by mirror 10 attached to the lens carrier 4 to mirror 11 which guides the laser beam to the lens 3.

The eccentrically of the lens 3 in relation to the axis of rotation of the lens carrier 4 is, in the illustrated embodiment, exactly the same as the eccentricity of the axis of rotation of the lens carrier 4 in relation to the axis of rotation of the bearing element 5. For this reason it is possible that with this arrangement the laser beam can be focussed on the center of the rotational movement of the bearing element 5, which position is illustrated in FIG. 5. The rotational movement of the bearing element is effected by the motor M1; the rotational movement of the lens carrier 4 about the bearing element 5 is effected by the motor M2 which is attached to the bearing element 5 and engages with a gear wheel 17 into a gear rim 18 which is constructed on the bearing element 5. The rotational movement of the bearing element is characterized by the arrow A, the rotational movement of the lens carrier is characterized by the arrow D.

Figure 4A:
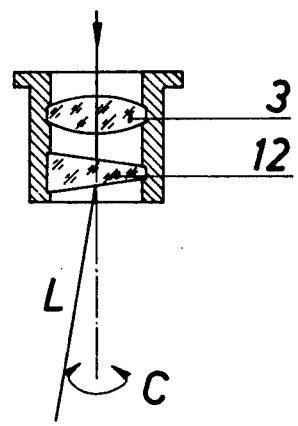

It should be noted that with this embodiment use can also be made of an inclination of the focussed laser beam in accordance with the embodiments of FIGS. 4 and 4a, should this be necessary. An axial displacement of the lens along the lines of FIG. 3 can also be provided. Altogether, in an embodiment modified in this way, four mutually independent parameters would be available for guiding the laser beam L on the web P. The invention allows a simultaneous and independent control of these different parameters so that any desired movements can be effected within the prescribed limits of movement.

Figure 6:
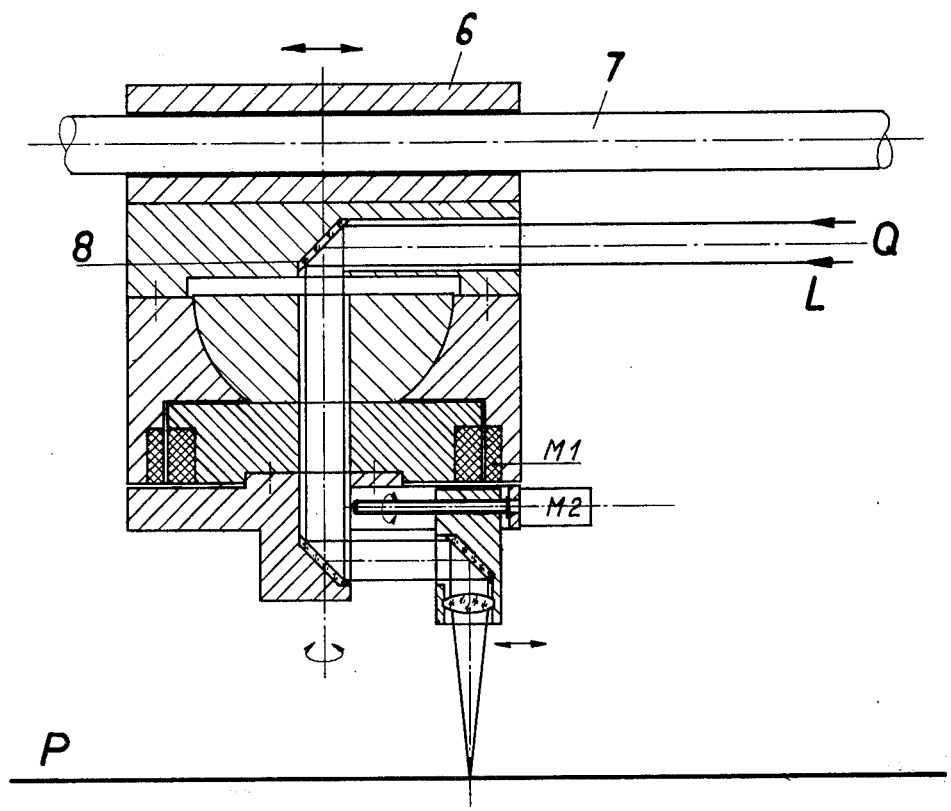
FIG. 6 shows an embodiment in which the lens carrier in one of the prescribed embodiments is mounted rigidly on the front end of a linear push rod, which is connected in a known manner to drive elements and position indicating elements.

FIG. 6 shows the lens carrier already described in FIG. 3 further comprising a collar on the front end of a linear feed element 6. The laser beam L here runs parallel to the linear feed axis 7 and passes into the axis of rotation of the collar via a surface mirror 8.

Underlying the invention is the concept of using movements running, where possible, in one direction only, i.e. of avoiding oscillating movements. With reference to the example of FIGS. 1b and 2 it has already been explained that this is possible with a very simply constructed device, e.g. along the lines of FIG. 3. Correspondingly the main components of movement can be achieved by only one, speed-controlled, circular movement, the additional components of movement, which for the most part are only necessary for compensation and for achieving special cut forms, are largely of a secondary nature so that where in special cases oscillating movements might be necessary the result gained by the invention is not affected.

The power supply of the various motors which move the individual elements of the optical system can be controlled by a normal electronic computer, which is pre-programmed according to the sectional view to be generated. Since programmed electronic computers are well known in the art, there is no need for further discussion here.

What is claimed is:

1. An apparatus for focal form cutting of a two-dimensional pattern on a moving web of material by means of a laser beam, wherein the focal lens of the laser beam is moved only in a plane parallel to the web in a circular path with further components of movement being superimposed thereon, and wherein all components of movement are variable in speed and controlled independently of one another, said apparatus including:
   a laser beam source,
   a lens focussing the laser beam on said web, the improvement comprising:
   a rotatable lens carrier,
   means for attaching said lens eccentrically to the axis of rotation of said rotatable lens carrier on said lens carrier such that the optical axis of the lens is substantially parallel to the axis of rotation of said rotatable lens carrier,
   means for passing the laser beam through the axis of rotation of the lens carrier,
   surface mirrors carried by said rotatable lens carrier for passing said laser beam from said rotatable lens carrier axis of rotation of said lens axis,
   a bearing element for said lens carrier and arranged on a rotatable carrier whose axis of rotation is parallel to the axis of rotation of the lens carrier and is spaced radially therefrom, and
   means for independently driving said rotatable lens carrier about its axis of rotation and for driving said bearing element about its axis of rotation;
   whereby, a two-dimensional pattern form cutting of the moving web is achieved whose greatest radius is determined by the eccentricity of the lens in relation to the lens carrier axis of rotation and the distance between the axis of rotation of said lens carrier and said bearing element.

2. An apparatus according to claim 1, characterized in that the eccentricity of the lens (3) in relation to the axis of rotation of the lens carrier (4) is at least as great as the eccentricity of the axis of rotation of the lens carrier in relation to the axis of rotation of the bearing element carrier (13).

3. An apparatus according to claim 1, characterized in that the lens (3) on the lens carrier (4) is tiltably mounted.

4. An apparatus according to claim 1, characterized in that the lens (3) is radially displaceable on the lens carrier (4).

5. An apparatus according to claim 1, characterized in that the lens carrier (4) is attached to an independently controllable linear feed unit (6, 7).

6. An apparatus for focal form cutting of a two-dimensional pattern on a moving web of material by means of a laser beam, wherein the focal lens of the laser beam is moved only in a plane parallel to the web in a circular path with further components of movement being superimposed thereon, and wherein all components of movement are variable in speed and controlled independently of one another, said apparatus including:
   a laser beam source,
   a lens focussing the laser beam on said web, the improvement comprising:
a rotatable lens carrier,
means for attaching said lens eccentrically to the axis of rotation of said rotatable lens carrier on said lens carrier such that the optical axis of the lens is substantially parallel to the axis of rotation of said rotatable lens carrier,
means for passing the laser beam through the axis of rotation of the lens carrier,
surface mirrors carried by said rotatable lens carrier for passing the laser beam from the rotatable lens carrier axis of rotation to said lens axis,
means for independently mounting said lens obliquely and for rotating said lens about an axis vertical to the web and parallel to the axis of rotation of said rotatable carrier and for directing the axis of the focussed laser beam obliquely to the web and independent variable speed driving means for driving said rotatable lens carrier about its axis of rotation and for driving said eccentrically positioned lens about the axis of rotation parallel to the axis of rotation of the rotatable lens carrier;
whereby, a two-dimensional pattern form cutting of the moving web is achieved whose greatest radius is determined by the eccentricity of the lens in relation to the lens carrier axis of rotation and the inclination of the optical axis of the lens in relation to the material web.

* * * * *